US 11,958,991 B2

United States Patent
Hawes et al.

(10) Patent No.: US 11,958,991 B2
(45) Date of Patent: *Apr. 16, 2024

(54) PAINT REMOVER COMPOSITION AND METHOD OF MAKING

(71) Applicant: W.M. Barr & Company, Inc., Memphis, TN (US)

(72) Inventors: Charles L. Hawes, Cordova, TN (US); Tim Teague, Nesbit, MS (US)

(73) Assignee: W.M. Barr & Company, Inc., Memphis, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/208,587

(22) Filed: Jun. 12, 2023

(65) Prior Publication Data

US 2023/0323140 A1 Oct. 12, 2023

Related U.S. Application Data

(63) Continuation of application No. 16/011,164, filed on Jun. 18, 2018, now Pat. No. 11,708,502.

(60) Provisional application No. 62/522,417, filed on Jun. 20, 2017.

(51) Int. Cl.
*C09D 9/00* (2006.01)
*C09K 3/30* (2006.01)

(52) U.S. Cl.
CPC ............. *C09D 9/005* (2013.01); *C09K 3/30* (2013.01)

(58) Field of Classification Search
CPC ................................. C09D 9/005; C09K 3/30
USPC ........................................................ 510/201
See application file for complete search history.

(56) References Cited

U.S. PATENT DOCUMENTS

| | | | |
|---|---|---|---|
| 2,551,634 | A | 5/1951 | Price |
| 4,854,973 | A | 8/1989 | Holdar |
| 5,308,527 | A | 5/1994 | Lallier et al. |
| 5,403,402 | A | 4/1995 | LeGrow |
| 5,744,437 | A | 4/1998 | Rowe et al. |
| 5,780,409 | A | 7/1998 | Distaso |
| 5,792,223 | A | 8/1998 | Rivas et al. |
| 6,159,915 | A | 12/2000 | Machace, Jr. et al. |
| 6,171,346 | B1 | 1/2001 | Yeazell et al. |
| 6,200,940 | B1 | 3/2001 | Vitomir |
| 6,673,157 | B1 | 1/2004 | McKim et al. |
| 6,699,829 | B2 | 3/2004 | Doyel et al. |
| 7,449,437 | B2 | 11/2008 | Gross et al. |
| 8,119,588 | B2 | 2/2012 | Bernhardt et al. |
| 8,309,502 | B2 | 11/2012 | Quillen et al. |
| 9,868,867 | B1 | 1/2018 | Manley |
| 11,708,502 | B2 * | 7/2023 | Hawes ............... C09D 9/005 510/209 |
| 11,827,812 | B2 * | 11/2023 | Breon ................. C09D 9/005 |
| 2004/0058832 | A1 | 3/2004 | Shank et al. |
| 2006/0089281 | A1 | 4/2006 | Gibson |
| 2006/0258555 | A1 | 11/2006 | Flippini et al. |
| 2007/0264175 | A1 | 11/2007 | Iversen et al. |
| 2008/0139437 | A1 | 6/2008 | Power |
| 2010/0104947 | A1 | 4/2010 | Choi et al. |
| 2010/0276149 | A1 | 11/2010 | Pope et al. |
| 2012/0128614 | A1 | 5/2012 | Rieth et al. |
| 2015/0014223 | A1 | 1/2015 | Fan et al. |
| 2016/0040071 | A1 | 2/2016 | Fan et al. |
| 2018/0362781 | A1 | 12/2018 | Hawes et al. |
| 2019/0106657 | A1 | 4/2019 | Hawes et al. |
| 2019/0169550 | A1 | 6/2019 | Hunt, Jr. et al. |
| 2019/0330481 | A1 | 10/2019 | Teague et al. |
| 2020/0399480 | A1 | 12/2020 | Byrd |

FOREIGN PATENT DOCUMENTS

| | | |
|---|---|---|
| CH | 670832 A5 | 7/1989 |
| DE | 19526351 A1 | 1/1997 |
| DE | 19526351 B4 | 6/2005 |
| WO | 2003062325 A2 | 7/2003 |
| WO | 2018039415 A1 | 3/2018 |
| WO | 2018236782 A1 | 12/2018 |

OTHER PUBLICATIONS

International Preliminary Report on Patentability issued for PCT International Pat. Appln. No. PCT/US2018/038159, mailed Dec. 24, 2019 (5 pages).
International Search Report and Written Opinion issued for PCT International Pat. Appln. No. PCT/US2019/029368, mailed Jun. 20, 2019 (10 pages).
International Search Report and Written Opinion issued for PCT International Pat. Appln. No. PCT/US2018/054921, mailed Dec. 14, 2018 (12 pages).
International Search Report and Written Opinion issued for PCT International Pat. Appln. No. PCT/US2018/038159, mailed Sep. 6, 2018 (7 pages).

* cited by examiner

*Primary Examiner* — Eisa B Elhilo
(74) *Attorney, Agent, or Firm* — Shumaker, Loop & Kendrick, LLP

(57) ABSTRACT

A composition for paint removal and methods of making and of using the composition are provided. The paint remover composition comprises a component selected from the group consisting of THF, toluene, acetone, DMSO, dioxalane, 1,2 trans dichloroethylene, and a combination thereof.

23 Claims, No Drawings

PAINT REMOVER COMPOSITION AND METHOD OF MAKING

CROSS-REFERENCE TO RELATED APPLICATION

This application claims priority from U.S. provisional patent application No. 62/522,417, filed on Jun. 20, 2018, in the United States Patent and Trademark Office. The disclosure of which is incorporated herein by reference in its entirety.

FIELD OF THE INVENTION

The present invention generally relates to paint removers.

BACKGROUND OF THE INVENTION

Most consumers use paint removers, also commonly referred to as paint strippers, for refinishing antique furniture, or woodworking's (doors, frames, moldings, etc.) in older houses. Many of these items have been painted, and repainted many times over the years. This results in items having multiple layers of paint containing different chemistry types and a different degree of difficulty from being removed. Paint removers are also used in the auto body repair industry to help with vehicle restoration.

Currently methylene chloride and N-Methylpyrrolidone (NMP) are used in the majority of paint removers in the United States. Methylene chloride has been the preferred solvent for use in paint removers for seventy years. Before methylene chloride was introduced, most paint removers consisted of volatile flammable solvents. Paint removers formulated with volatile solvents are extremely flammable and the flammability of these paint removers resulted in fires causing injury and deaths. These paint removers were rapidly replaced with the methylene chloride paint removers because methylene chloride paint removers can be formulated to be non-flammable and are effective in removing multiple layers of paint. The physical characteristics give the methylene chloride molecule the ability to quickly penetrate multiple layers and to soften or dissolve chemically resistant coatings. Methylene chloride does not deplete the ozone layer and is considered to make negligible contributions to smog formation, the green-house effect and acid rain. Like other organic solvents, methylene chloride can be harmful to human health if used improperly.

However, regulations are changing to remove methylene chloride and NMP from the environment. For example, the US Environmental Protection Agency (EPA) is considering a range of possible voluntary and regulatory actions to address risks from the use of methylene chloride-containing paint and coating removal products.

According to the EPA, NMP is both produced and imported into the United States, with use estimated at over 184 million pounds per year. EPA estimates that approximately 9 percent of total NMP usage is for paint and coating removal products.

On Jan. 12, 2017, EPA issued a proposed rule under section 6 of the Toxic Substances Control Act with two proposed approaches for regulating NMP. According to the EPA, one approach is to prohibit the manufacture (including import), processing, and distribution in commerce of NMP for consumer and commercial paint and coating removal; to prohibit commercial use of NMP; and to require manufacturers, processors, and distributors, except for retailers, of NMP to provide downstream notification of these prohibitions throughout the supply chain; and to require limited recordkeeping. According to the EPA, the second approach is a combination of requirements to address unreasonable risks to workers and consumers including to limit the amount of NMP in paint removal products to no more than 35 percent by weight; require formulators to evaluate and identify specialized gloves that protect against skin absorption; require occupational users to have worker protection programs to require that workers wear personal protective equipment to prevent skin and inhalation exposures, require hazard communication for commercial users; and require warning labels for consumers with detailed information on proper ways to reduce exposure.

Thus, there is a need for an alternative paint remover that is effective.

SUMMARY OF THE INVENTION

The present invention generally relates to a paint remover composition and method of making.

In an embodiment of the invention, a paint remover composition comprising tetrahydrothran (THF) is provided.

In an embodiment of the invention, a paint remover composition comprising a combination of THF and a solvent is provided.

In an embodiment of the invention, the solvent is selected from the group consisting of THF, acetone, toluene, dimethyl sulfoxide (DMSO), dioxalane, 1,2 trans dichloroethylene, and a combination thereof is provided.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The present invention has broad potential application and utility. The following description is provided herein solely by way of example for purposes of providing an enabling disclosure of the invention, but does not limit the scope or substance of the invention.

In an embodiment of the invention, a paint remover composition comprising tetrahydrofuran (THF) is provided. Preferably, THF and at least one other solvent are used in combination.

In an embodiment of the invention, THF and acetone are used in combination in the composition for paint removal. It has surprisingly been found that there is an unexpected synergy between THF and acetone in removing dried paint from a painted surface.

In an embodiment of the invention, THF and acetone are preferably used in combination in a range of 4 weight % to 90 weight % THF and 4 weight % to 90 weight % acetone. THF and acetone can be used in a combination in a range of 4 weight % to 75 weight % of THF and 4 weight % to 75 weight % of acetone. THF and acetone can be used in a combination in a range of 4 weight % to 50 weight % of THF and 4 weight % to 50 weight % of acetone.

Other components may be present in the formulation for paint removal. Non-limiting examples of other such components include, but are not limited to, dye, paraffin wax, antioxidant, surfactant, thickener, fumed silica, corrosion inhibitor, ammonia, peroxide inhibitor (including but not limited to butylated hydroxytoluene), or a combination thereof.

Other components, alone or in combination, may be added in a range of 0 weight % to 25 weight %, more preferably 0.01 weight % to 12.5 weight %.

In an embodiment of the invention, THF and dimethyl sulfoxide (DMSO) are used in combination in the composition for paint removal. It has surprisingly been found that there is an unexpected synergy between THF and DMSO solvents in removing dried paint from a painted surface. THF and DMS may be used along with acetone. The paint remover composition of the present invention is suitable for chemically stripping paint of various kinds on various surfaces.

In an embodiment of the invention, THF and DMSO are preferably used in combination in a range of 4 weight % to 90 weight % THF and 4 weight % to 90 weight % DMSO. THF and DMSO can be used in combination in a range of 20 weight % to 75 weight % of THF and 20 weight % to 75 weight % of DMSO. THF and DMSO can be used in combination in a range of 4 weight % to 45 weight % of THF and 4 weight % to 45 weight % of DMSO. The weight percentages are based on the total weight percentage of the composition.

In an embodiment of the invention, a composition for paint removal is provided. The paint remover composition generally comprises: 4 weight % to 45 weight % DMSO, 4 weight % to 45 weight % THF or other solvent, 0.5 weight % to 2 weight % cellulose ether thickener, 40 weight % to 60 weight % acetone, 0.2 weight % to 1.0 weight % paraffin, 0 weight % to 2 weight % nonionic surfactant, and 0 weight % to 5 weight % of a primary, secondary or tertiary amine, wherein the weight percentages are based on the weight of the total composition.

A solvent is a single solvent or a combination of solvents. Preferably, the solvent is selected from the group consisting of THF, toluene, DMSO, dioxalane, 1,2 trans dichloroethylene, and a combination thereof. More preferably, the solvent is a combination of THF and DMSO. THF and DMSO in combination have found to have a synergistic effect in a paint remover.

Other solvent combinations demonstrating a synergistic effect in a paint remover include, but are not limited to, THF and DMSO; toluene and DMSO; Dioxalane and DMSO; 1,2 trans dichioroethylene and DMSO; and a combination thereof.

EXAMPLES

Example 1

Paint stripping tests were conducted in accordance with the present invention. The paint stripping test used a proposed formula in accordance with the present invention in which a solvent was varied in the tests. Stripping ability was measured after 15 and 30 minutes by scraping layers of paint off a board using a plastic scraper. Scraping was made at a low angle from the board without using pressure that would dig into the paint. The purpose was to see how much paint would remove with ease in the test in order to more accurately evaluate the effect of the chemical solvent on the paint without agitation (other than to remove the loosened and softened paint layers and not layers beneath that have not reacted to the stripper in the time period allowed).

The paint panel was prepared as follows using Rust Oleum's Oil based paints:

First layer=Blue
Second layer=White
Third layer=Green
Fourth layer=Yellow
Fifth layer=Red The fifth layer was the top layer, and there were five layers in total. Each layer set for one 24 hour period before the next layer. Each coat of paint was roiled on in a usual manner using a standard 6" long paint roller with a ¼" nap. After the last application of paint, the boards were placed at 50 C for 30 days in order to cure further.

The stripper formulation tested is set forth in Table 1:

TABLE 1

10.0 weight % toluene
0.8 weight % paraffin wax (127° F. melting point)
1.25 weight % cellulose ether thickener (Tylose PS0810001)
29.5 weight % solvent (varied for testing purposes)
46.95 weight % acetone
10.0 weight % methanol
0.5 weight % nonionic surfactant (Tomadol 900)
1.0 weight % Aqua Ammonia (26 Deg. Baume)

Note that weight percentages are based on the total weight of the formulation.

The solvents tested were:

(1) Dimethyl sulfoxide (DMSO), (2)toluene, (3) 1, 2 trans dichloroethylene, (4) Dioxalane, and (5) Tetrahydrofuran (THF).

The order of performance, greater to lower, of these 5 solvents were as follows with THF being the greater and 1, 2 transdichloroethylene being the lower:

THF
Toluene
Dioxalane
DMSO
1,2 transdichloroethylene

Blends of the experimental solvents were also tested.

The base blend for these experiments was:

TABLE 2

24.75 weight % DMSO
24.75 weight % solvent (varied for testing purposes)
1.25 weight % cellulose ether thickener (Tylose)
46.95 weight % acetone
0.8 weight % paraffin
0.5 weight % nonionic surfactant (Tomadol 900)
1.0 weight % aqua ammonia Note that weight percentages are based on the total weight of the formulation The stripping test results were visually inspected after setting 15 and 30 minutes.

All of the blends tested demonstrated synergy; however, the THF/DMSO combination was the best performing synergistic blend. The order of performance found, from greater to lesser, was with THF/DMSO blend being greater and 1,2 trans dichloroethylene/DMSO blend being lesser:

THF/DMSO
Toluene/DMSO
Dioxalane/DMSO
1,2 trans dichloroethylene/DMSO

THF and DMSO were tested in various ratios of THF/DMSO: 50/50, 100/0, 0/100, 75/25, 25/75, 90/10, 10/90, 82.5/17.5, and 17.5/82.5.

Example 2

Paint stripper formulations were tested in accordance with the present invention and are set forth in Table 3. The formulations were in a form of a liquid or an aerosol.

TABLE 3

| Components | Weight Percentage (%) |
|---|---|
| THF | 49.5 |
| Dye | 0.002 |
| Paraffin Wax (refined) | 0.25 |
| BHT | 0.025 |
| Acetone | 40 to 45 |
| Surfactant | 1 |
| Fumed Silica | 0 to 5 |
| Thickener | 0.1 to 1.25 |
| Diglycolamine | 0.5 |
| Aqua Ammonia | 5 |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

The invention claimed is:

1. A paint remover composition comprising:
tetrahydrofuran (THF) ranging from 4 weight % to 75 weight %,
acetone ranging from 4 weight % to 75 weight %,
ammonia and
a component comprising dye, paraffin wax, antioxidant, surfactant, thickener, fumed silica, corrosion inhibitor, peroxide inhibitor, or any combination thereof.

2. The paint remover composition according to claim 1, wherein the composition further comprises toluene, dimethyl sulfoxide (DMSO), 1,2 trans dichloroethylene, or a combination thereof.

3. The paint remover composition according to claim 1, wherein the THF is present in a range of 4 weight % to 50 weight % and acetone is present in a range of 4 weight % to 50 weight %.

4. The paint remover composition according to claim 1, wherein the composition is in a form of a liquid or an aerosol.

5. A method of removing paint comprising applying the paint remover composition of claim 1 to a painted surface, and removing paint from the painted surface.

6. The paint remover composition according to claim 4, wherein the THF is present in a range of 29.5 weight % to 49.5%, and the acetone is present in a range of 40 weight percent to 46.95%.

7. The paint remover composition according to claim 2, wherein the composition further comprises DMSO, and wherein the DMSO is present at a range of 4 weight % to 90 weight %.

8. The paint remover composition according to claim 2, wherein the DMSO is present at a range of 20 weight % to 75 weight %.

9. The paint remover composition according to claim 2, wherein the DMSO is present at a range of 4 weight % to 45 weight %.

10. The paint remover composition according to claim 2, wherein the DMSO is present at 24.75 weight %.

11. The paint remover composition according to claim 1, wherein the component is present in a range of 0.01 weight % to 12.5 weight % based on the weight of the composition.

12. The paint remover composition according to claim 11, wherein the component comprises paraffin wax and fumed silica.

13. The paint remover composition according to claim 12, wherein the component comprises a corrosion inhibitor.

14. The paint remover composition according to claim 13, wherein the component comprises an antioxidant.

15. The paint remover composition according to claim 11, wherein the component comprises a corrosion inhibitor.

16. The paint remover composition according to claim 11, wherein the component comprises an antioxidant.

17. The paint remover of claim 1, wherein the paint remover includes at least two components selected from the following: a dye, paraffin wax, antioxidant, surfactant, thickener, fumed silica, corrosion inhibitor, and/or a peroxide inhibitor.

18. The paint remover of claim 1, wherein the paint remover includes at least three components selected from following: a dye, paraffin wax, antioxidant, surfactant, thickener, fumed silica, corrosion inhibitor, and/or a peroxide inhibitor.

19. The paint remover of claim 1, wherein the paint remover includes at least four components selected from the following: a dye, paraffin wax, antioxidant, surfactant, thickener, fumed silica, corrosion inhibitor, and/or a peroxide inhibitor.

20. The paint remover of claim 1, wherein the paint remover includes at least five components selected from the following: a dye, paraffin wax, antioxidant, surfactant, thickener, fumed silica, corrosion inhibitor, and/or a peroxide inhibitor.

21. The paint remover of claim 1, wherein the paint remover includes at least six components selected from the following: a dye, paraffin wax, antioxidant, surfactant, thickener, fumed silica, corrosion inhibitor, and/or a peroxide inhibitor.

22. The paint remover of claim 1, wherein the paint remover includes at least seven components selected from the following: a dye, paraffin wax, antioxidant, surfactant, thickener, fumed silica, corrosion inhibitor, and/or a peroxide inhibitor.

23. The paint remover of claim 1, wherein the paint remover includes a dye, paraffin wax, antioxidant, surfactant, thickener, fumed silica, corrosion inhibitor, and a peroxide inhibitor.

* * * * *